United States Patent [19]

Schultze et al.

[11] Patent Number: 4,834,691
[45] Date of Patent: May 30, 1989

[54] DEVICE FOR SEALING BEARING BUSH OF A UNIVERSAL JOINT

[75] Inventors: Hans-Jürgen Schultze, Essen; Gerd Faulbecker, Hattingen; Wilfried Gille, Dorsten, all of Fed. Rep. of Germany

[73] Assignee: Gelenkwellenbau GmbH, Essen, Fed. Rep. of Germany

[21] Appl. No.: 121,682

[22] Filed: Nov. 17, 1987

[30] Foreign Application Priority Data

Nov. 17, 1986 [DE] Fed. Rep. of Germany ....... 3639315

[51] Int. Cl.⁴ .................... F16C 33/78; F16D 3/41
[52] U.S. Cl. ...................... 464/131; 277/58; 277/152; 277/227; 384/486
[58] Field of Search ............... 277/58, 152, 181, 199, 277/227; 384/481, 484, 485, 486; 464/131

[56] References Cited

U.S. PATENT DOCUMENTS

| | | | |
|---|---|---|---|
| 2,996,901 | 8/1961 | Kleinschmidt | 464/131 |
| 3,174,813 | 3/1965 | Selz | 464/131 X |
| 3,858,413 | 1/1975 | Nemtsov et al. | 464/131 X |
| 4,312,547 | 1/1982 | Negele et al. | 384/486 |
| 4,337,628 | 7/1982 | Greene | 464/131 |
| 4,440,401 | 4/1984 | Olschewski et al. | 464/131 X |
| 4,576,382 | 3/1986 | Scharting et al. | 464/131 X |

FOREIGN PATENT DOCUMENTS

| | | |
|---|---|---|
| 1908265 | 10/1969 | Fed. Rep. of Germany . |
| 2144401 | 3/1973 | Fed. Rep. of Germany ...... 384/486 |
| 2556769 | 12/1976 | Fed. Rep. of Germany . |
| 3118430 | 11/1982 | Fed. Rep. of Germany ...... 464/131 |
| 3419111 | 11/1985 | Fed. Rep. of Germany . |
| 8616597 | 9/1986 | Fed. Rep. of Germany . |
| 2450976 | 10/1980 | France . |
| 2094418 | 9/1982 | United Kingdom . |

Primary Examiner—Daniel P. Stodola
Attorney, Agent, or Firm—Toren, McGeady & Associates

[57] ABSTRACT

In a universal joint a device is provided for sealing an annular gap between a laterally closed bearing bush of the joint and a pin on a spider located within the bush. A plurality of cylindrically shaped bearing members are located within the annular gap in the bearing bush with an annular stop plate positioned at the ends of the bearing members facing the open end of the bush. A combination support member and sealing member is located in the annular gap with parts of the support member extending through the sealing member for supporting the stop plate. The sealing member is spaced from the stop plate. The support member divides the sealing member into a first part located between the support member and the pin, and a second part located between the support member and the inside wall of the bearing bush.

9 Claims, 3 Drawing Sheets

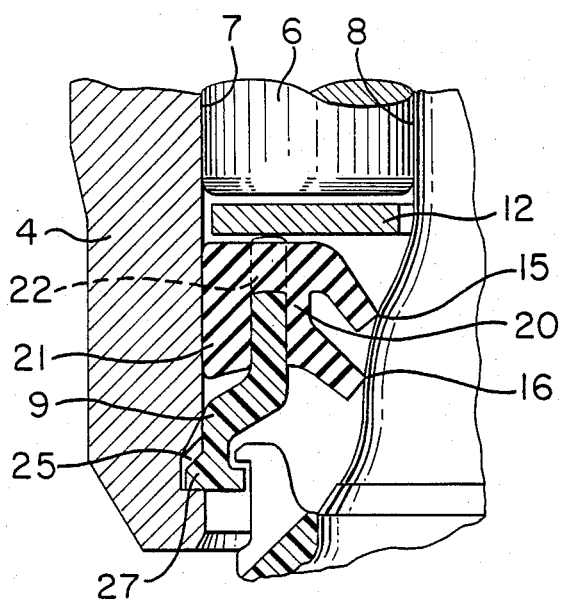
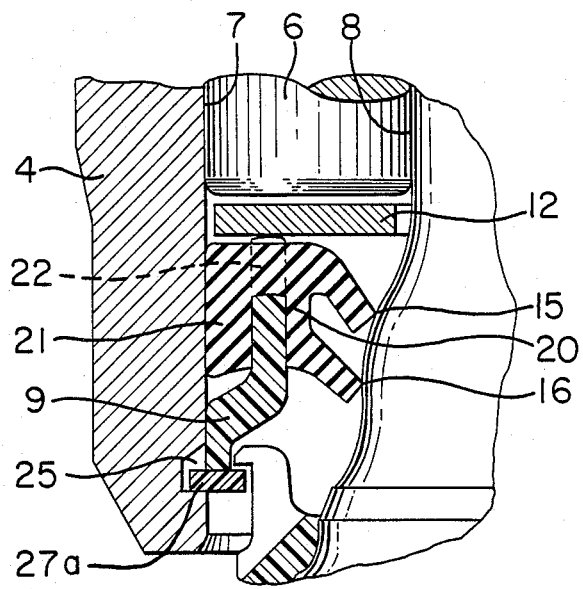
FIG. 4     FIG. 4a
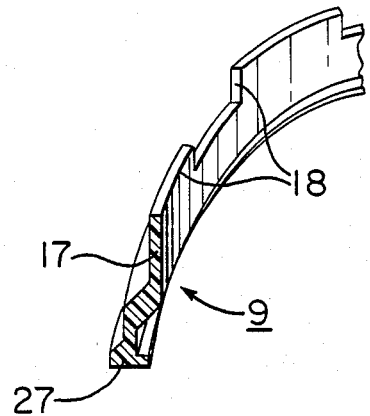
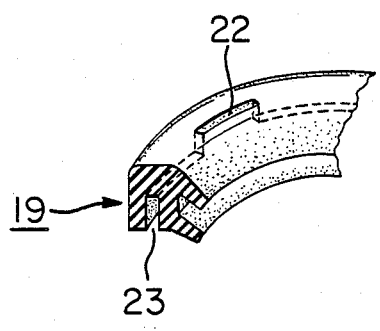
FIG. 5     FIG. 6

DEVICE FOR SEALING BEARING BUSH OF A UNIVERSAL JOINT

BACKGROUND OF THE INVENTION

The present invention is directed to a device for sealing an annular gap located between a laterally closed bearing bush of a universal joint and a pin of a spider inserted into the bush. The device axially supports cylindrically shaped bearing members located within the annular gap. A stop plate is located at one end of the bearing members and a seal is spaced from the stop plate and provides a sealing action between the inner wall of the bush and the circumferentially extending outer face of the pin. A support member acts as a carrier for the seal and is located spaced between the outer face of the pin and the inner wall of the bearing bush.

In a known design disclosed in DE-PS No. 31 18 430, a seal carrying the stop plate is connected to the bearing bush. The connection is provided by resilient circumferential parts and by engagement into a groove in the inner wall of the bearing member.

Sealing relative to the spider is afforded by sealing lips. The sealing lips open under the pressure of the lubricant, accordingly, the seal is intended for use in a universal joint to which lubricant can be added. This design has the disadvantage that with higher axial forces exerted by the bearing members on the stop plate and the seal connected to it, the seal may be pushed out.

Therefore, the bearing members may run against the angular transition face of the spider and lead to jamming and destruction of the bearing.

Another disadvantage is that to insure a firm arrangement of the seal stop plate in the bearing bush and accurate positioning, it is necessary to provide a stepped bore which tends to weaken the bearing bush and the supporting forces which, to insure satisfactory holding in the bearing bush, require the bush to have a corresponding thickness which cannot be sufficiently accommodated. Still another disadvantage is that during assembly the free ends of the sealing lips face away from the slipping-on direction.

In DE-AS No. 25 56 769, there is a known seal firmly arranged on the pin. The bearing members are supported directly against the seal. The disadvantage in this arrangement is that the seal is capable of accommodating only low axial forces from the bearing members.

In DE-GM No. 86 16 597, there is another known prior art device which provides for a separate arrangement of a stop plate axially held relative to the bush by a securing ring. This arrangement cannot prevent axial movement of the bearing members and loading of the seal. Furthermore, it influences the axial length or limits the assembly length for the bearing members.

It has been found that as a result of production-related play, the bearing members when torque loaded are inevitably moved into an inclined position.

Such inclined position produces axial forces moving the bearing members in the direction of the open end of the bearing bush. These axial forces exert a load on the seal and may cause it to be displaced from its seat or may cause leakage. Either effect leads to a reduction in service life or to an early failure.

In still another known arrangement in DE-OS No. 34 19 111, the seal is provided with an angle collar supported by a holding ring relative to a groove in the bearing bush. The disadvantage of this arrangement is that the angle collar must be precision manufactured to afford a firm fit. If the over-dimension selected for achieving a firm fit is too great, additional loads will be exerted on the relatively thin-wall bearing bush. If the over-dimension is too small, there is the risk that the seal turns relative to the bearing bush whereby accurate sealing conditions no longer prevail. Moreover, there is no possibility of achieving a seal between the outer face of the angle collar and the inner wall of the bearing bush with the risk of lubricant escaping from or penetrating into this region which adversely affects the holding function.

Finally, DE-OS No. 20 47 420, proposes an angle collar embedded in the seal. Axial support is provided in an elastic manner by the sealing material itself, so that again there is the risk of the bearing members assuming an inclined position.

SUMMARY OF THE INVENTION

Therefore, it is the primary object of the present invention to provide a device for sealing and axially supporting cylindrically shaped bearing members which is capable of resisting even higher axial forces exerted by the bearing members without any negative influence being exerted on the seal and the bearing.

In accordance with the present invention, the support member is provided with a cylindrically shaped part extending approximately concentrically relative to the outer face of the pin with circumferentially spaced projections on the cylindrical part extending axially from one end into contact with the stop plate so that the ends of the projections act as stops. Further, the support member supports a separate sealing member with its projections extending through the sealing member. The sealing member includes a first sealing part located between the support member and the outer face of the pin and a second sealing part located between the support member and the inner wall of the bearing bush.

One advantage of the device is that the supporting function and the sealing function have been separated affording a direct introduction of the supporting forces from the rolling members and in consequence accurate guidance of the rolling members. By dividing the sealing member into separate parts, it is capable, due to the arrangement of the sealing member to assume or assist a holding function relative to the bearing part, that is, either to the bush or the pin with respect to which the sealing member along with the support member is intended to be held in a non-rotating manner.

Accordingly, the seal does not have any support function and the movement of the bearing members or the axial forces resulting from such movement do not exert any influence on the seal. This arrangement has the further advantage by dividing the sealing member into two parts, that it is possible to select a relatively high pre-tension relative to the part in relation to which the seal does not effect relative movement, that is, the pin, a design which enhances the non-rotating connection between the support member and the pin. The part of the sealing member intended to seal the inner wall of the bearing bush may, on the other hand, be correspondingly soft to achieve a good sealing action.

In a preferred arrangement the support member is arranged on the pin so that it does not rotate, and in the axial direction of the pin it is supported on a radiused surface. By associating the support member to the pin of the spider, that is, by producing a non-rotating connection between the two parts, sufficient axial support is insured. By associating the support member with the spider, there is no risk of any sealing parts being pushed out of their seat.

A further advantage of the non-rotating arrangement relative to the pin is that the bearing bush does not require a stepped bore and, accordingly, is not weakened. Furthermore, by providing a non-rotating association with the pin, a transition with large radii is achieved and machining in the transition region does not require any surface accuracy such as would be needed if the lips of the seal carried out movement relative to the pin. The large radii also insure uniform distribution of the axial forces and lead to an increase in the load bearing capacity.

In another embodiment of the invention, the support member is provided with a sealing lip bearing against an end face in the region of the open end to the bearing bush. This feature affords a so-called preseal for preventing the penetration of dirt into the actual sealing region. The contact of the sealing lip with the end face is such that through-lubrication is possible. In a further embodiment, the sealing member is provided with a number of apertures corresponding to the number of projections on the cylindrical part of the support member and with an annular recess for at least partially receiving the cylindrical part.

To insure that the seal does not move relative to the bearing bush, the support member has a projection fitted into a groove in the inner wall of the bearing bush.

It is also possible to support the support member on a separate support ring held in a groove in the inner wall of the bearing bush.

The support member may also be fixed by partially deforming its cylindrical wall into the groove in the bearing bush.

Preferably, the support member is made of polyamide or similar plastics. Such plastics material is characterized by high strength values.

To permit preassembly, it is envisioned in a preferred embodiment, in the region of the end face at the open end of the bearing bush, that the support member has one or several circumferentially spaced assembly support faces and that the sealing lip affording sealing relative to the inner face of the bearing bush or to the outer face of the pin extends at an angle relative to the pin axis with the free end of the lip pointing in the direction of the open end of the bush.

Such an arrangement makes it possible to produce a preassembled unit of the bearing bush along with the bearing members, the stop plate and the combined support member and sealing member. This preassembled unit can be slipped onto the pin of the spider. Furthermore, by slipping the preassembled unit onto the pin, any relative movement in the axial direction of the bush between the sealing lips and the inner wall of the bearing bush is avoided. The axially directed assembly forces are accommodated by the additional assembly supporting faces on the support member. Due to the assembly supporting faces and the end face of the bearing bush, these axial forces are introduced directly into the bush wall. The seal itself remains completely unaffected by the slipping-on forces.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings

FIG. 4 is a view similar to FIG. 3 of another embodiment of detail A in FIG. 2 on an enlarged scale;

FIG. 4a is a view similar to FIG. 3 with a separate supporting ring;

FIG. 5 is a partial perspective view, partly in section, of a support member illustrated in FIG. 4; and FIG. 6 is a partial perspective view of a sealing member displayed in FIG. 4.

DETAILED DESCRIPTION OF THE INVENTION

Figure 1:
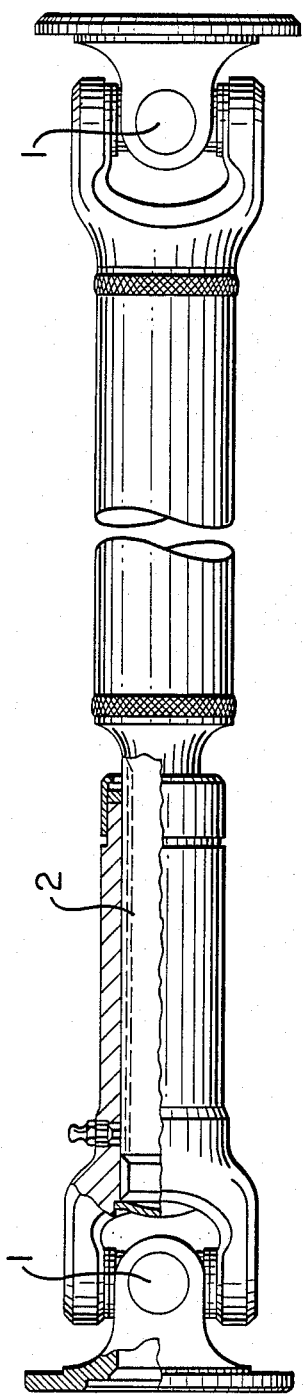
FIG. 1 is a diagrammatic side view, partly in section, of a propeller shaft.
Figure 2:
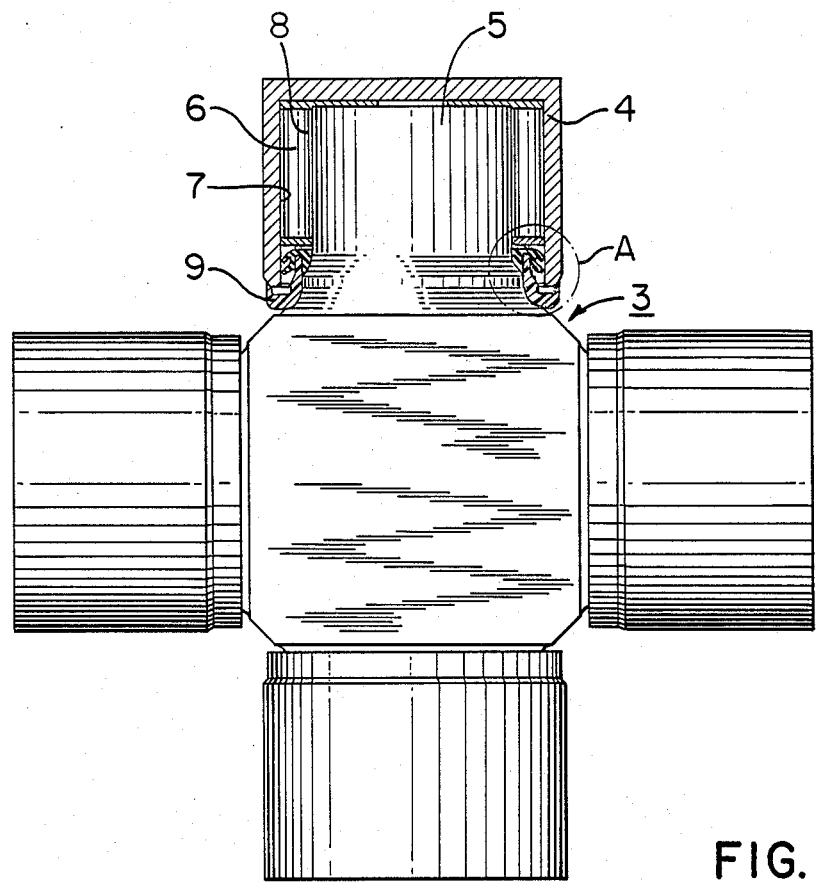
FIG. 2 is a view, partly in section, of a spider arrangement embodying the present invention.

In FIG. 1, a propeller shaft is shown including two universal joints 1, each with a yoke connected to a flange and another yoke connected to a sliding assembly 2. Sliding assembly 2 is formed of a axially extending shaped sleeve connected to one of the joints 1, and a journal connected to the other joint 1. The yokes of each joint are connected by a spider set as displayed in FIG. 2. The spider set is made up of a spider 3 with four outwardly projecting pins 5, positioned at right angles to one another. Each pin 5 has an axially extending cylindrically shaped outer face 8. Cylindrically shaped bearing members 6 are arranged around the outer face 8 of the pin 5 so that the bearing members roll on the outer face. Bearing members 6 are enclosed by a bearing bush 4. Bearing members 6, arranged in the circumferential direction around the pin, run on the inner wall 7 of the bearing bush and on the outer face 8 of the pin.

Bearing bush 4 has a closed end outwardly from the spider 3 and an open end adjacent the spider. Bearing bush 4 has a bottom part, possibly along with a bearing plate, located at its closed end and supported on the corresponding outer end face of the pin 5. The open end of the bearing bush 4 is closed by a seal or sealing member 19. Seal 19 is illustrated in more detail in FIGS. 3 to 6 and will be explained based on these figures. For purposes of simplification, FIGS. 3 to 6 only give sectional views of the arrangement as shown in detail A in FIG. 2. However, the seal extends around the circumference of the outer face 8 of the pin 5, and of the inner wall 7 of the bearing bush 4.

Figure 3:
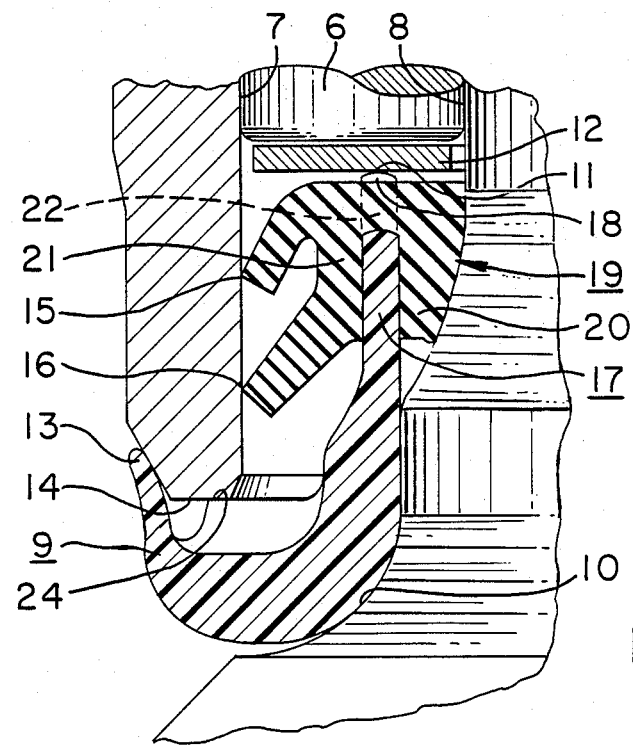
FIG. 3 is a sectional view on an enlarged scale of detail A in FIG. 2.

The seal arrangement in FIG. 3 comprises a support member 9 with a J-shaped cross-section including a cylindrical part 17, having circumferentially spaced upwardly extending projections 18 in the shape of a crown. The upper end faces of the projections 18 form stop faces 11. An annular stop plate 12 rests on the stop faces 11. Bearing members 6 are in contact with and extend axially upwardly from the opposite face of the stop plate 12.

At its lower end as viewed in FIG. 3, cylindrical part 17 of the support member 9 passes with a radiused surface into a radially extending part. The radiused surface of the support member 9 is axially supported and held on a corresponding radiused face 10 of the spider 3. The radius of the contacting surfaces may be relatively large and has a favorable influence on the strength of the spider and also provides good load distribution for the supporting surfaces produced by the support member 9 with the supporting forces intended to prevent displacement of the bearing members, that is, the supporting forces hold the bearing members in the axial position. At the radially outer free end of the radially extending part at the lower end of the support member 9, there is a sealing lip 13 integral with the radially extending part and bearing against an end surface 14 of the bearing bush 4.

The sealing lip 13 acts as a preseal, that is, its particular object is to prevent any dirt penetrating into the bearing bush from the outside. Further, the sealing lip 13 bears against the radially outer surface of the bearing bush adjacent the end face 14 so that if there is grease within the bearing bush, the sealing lip will lift off from the end surface 14 and allow excess grease to escape. Cylindrical part 17 of the support member 9 mounts the sealing member 19. Sealing member 19 has a corresponding annular recess 23, note FIG. 6, into which the support member 9 fits. In addition, sealing member 19 has apertures 22 spaced in the circumferential direction of its upwardly facing end face with the apertures being open into the recess 23. The spacing of the apertures in the circumferential direction corresponds to the spacing of projections 18 on the support member 9. Projections 18 on the support member 9 extend through the apertures 22. Furthermore, the length of the projections 18 in the axial direction of the pin is such that they project beyond the upper end face of the sealing member 19 into contact with the stop plate 12 thereby preventing contact between the stop plate and the sealing member. Accordingly, the necessary supporting forces are introduced from the bearing members 6 through the stop plate 12 directly into the support member 9. As a result of the recess 23, in which the cylindrical part 17 is located, the sealing member 19 is divided into two parts, a first part 20 provides a sealing action between the support member 9 and the outer face 8 of the pin 5, and a second part 21 provides a sealing action between the support member 9 and the inner wall 7 of the bearing bush 4. In the embodiment shown in FIG. 3, if the support member 9 is fixed relative to the spider 3 and the pin 5, respectively, the first sealing part 20 facing the pin is designed as a solid seal with its radially inner face conforming to the outer face 8 of the pin 5.

In the embodiment of FIG. 3, the face of first sealing part 20, directed toward the outer face 8 of the pin 5, is cylindrically shaped at its upper end and then changes over into a radiused surface in the direction toward the open end of the bush 4. The thickness of first sealing part 20 in the radial direction insures that it has a fixed fit on the pin 5. In other words, the first sealing part 20 between the cylindrical part 17 and the outer face 8 of the pin 5 is compressed. This feature, however, does not in any way affect the remaining second sealing part 21 because the respective supporting forces are accommodated by the support member 9.

Inner wall 7 of the bearing bush 4 is sealed by second sealing part 21 which has two sealing lips 15, 16 spaced apart in the axial direction of the bush. The sealing lips 15, 16 extend at an angle relative to the inner wall 7 of the bush 4 and to the axis of the pin 5, that is, the sealing lips are angled outwardly from the second sealing part 21 so that they face toward the open end of the bearing bush 4. This arrangement insures that no dirt can penetrate from the outside, while under the pressure of lubricant within the bush, the sealing lips 15, 16 can be displaced from the inner wall 7 of the bearing bush 4 so that the lubricant can flow past the lips. Furthermore, the apertures 22 in the sealing member 19 arranged to receive the projections 18 on the cylindrical part 17, insure a non-rotatable connection between the support member 9 and the sealing member 19.

Support member 9 has one or more circumferentially spaced assembly supporting faces 24, note FIG. 3, which are supported against the lower end face 14 at the open end of the bearing bush 4, at least during the assembly procedure.

The assembly procedure takes place generally as follows:

First, bearing members 6 are inserted into the bearing bush 4, using grease, and are held in position. In axial sequence, the stop plate 12 is inserted and then the support member 9 mounting the sealing member 19 is slid into the bearing bush.

This assembly unit, in its entirety, is then slid onto the pin 5 of the spider 3. The required sliding-on force exerted against the bottom of the bush is applied by the support member 9 without having any adverse effect on the seals 15, 16.

In the embodiment in FIG. 4, the support member 9 is associated with the bearing bush 4 so that it does not move relative to the bush. A nose 27 at the lower end of the support member 9, as viewed in FIG. 4, engages into a groove 25 in the inner wall 7 of the bearing bush 4. The nose can be replaced by a separate supporting ring 27a, as shown in FIG. 4a. As distinguished from the embodiment in FIG. 3, in FIG. 4 the second sealing part 21 located between the cylindrical part 17 of the support member 9 and the inner wall 7 of the bearing bush 4, is a solid seal and functions in the same manner as the first sealing part 20 in FIG. 3. In FIG. 4, the first sealing part 20 has the sealing lips 15, 16 which are supported against the outer face 8 of the pin 5. In this embodiment, the relative movement takes place between the sealing lips 15, 16, that is, the first sealing part 20, and the pin 5. Another difference in the embodiment of FIG. 4 is the pre-sealing part, that is, the radially extending part of the support member 9, which is associated with a separate component as distinguished from the embodiment in FIG. 3. The separate component is not shown in FIG. 4.

As illustrated in FIG. 5, the projections 18 at the upper part of the cylindrical part 17 of the support member 9 are formed in a crown-like or castellated manner. Projections 18 correspond to the apertures 22 in the sealing member 19, note FIG. 6. In addition, the cylindrical part 17 of the support member 9 engages in the recess 23 of the sealing member 19.

While specific embodiments of the invention have been shown and described in detail to illustrate the application of the inventive principles, it will be understood that the invention may be embodied otherwise without departing from such principles.

We claim:

1. A device for sealing an annular gap between a cylindrically shaped inner wall of a laterally closed bearing bush and a cylindrically shaped outer face of a pin on a spider with the pin located within the bearing bush, a plurality of cylindrically shaped bearing members located within the annular gap between the inner wall of the bush and the outer face of said pin, said device arranged for axially supporting said bearing members, a seal located within the annular gap and spaced from said bearing members, an annular stop plate located in said annular gap between said seal and said bearing members, a support member located within said annular gap for supporting said seal with said seal contacting said inner wall of said bush and said outer face of said pin, wherein the improvement comprises that said support member is located on the opposite side of said stop plate from said bearing member and includes a cylindrical part located within said annular gap concentric to and spaced radially outwardly from said outer face of said pin and radially inwardly from said inner wall of said bearing bush, said cylindrical part having circumferentially spaced projections extending axially from an end of said cylindrical part closer to and toward said stop plate, said projections having end faces directed toward said stop plate, said stop plate being supported on said end faces of said projections, said seal comprises a separate sealing member mounted on said support member with said projections extending through said sealing member, said sealing member being in spaced relation to said stop plate, and said sealing member having a first sealing part located between said support member and said outer face of said pin and a second sealing part located between said support member and the inner wall of said bearing bush.

2. A device, as set forth in claim 1, wherein said pin extends axially outwardly from said spider having a free first end located within said bearing bush and a second end secured to said spider, said second end of said pin has an axially extending supporting face extending radially outwardly relative to the outer face of said pin and said supporting face having a radiused surface, and said support member is supported on said radiused surface of said supporting face.

3. A device, as set forth in claim 1, wherein said bearing bush is open at the end closer to said spider, said supporting member has a sealing lip extending radially outwardly from said cylindrical part and bears against a radially outer surface of said bearing bush adjacent the open end thereof.

4. A device, as set forth in claim 1, wherein said sealing member has an annular recess therein with said cylindrical part of said support member positioned within the annular recess, said sealing member has a plurality of apertures extending therein from said recess toward and through a surface of said sealing member directed toward said stop plate, said apertures being shaped corresponding to the shape of said projections on said cylindrical part and arranged to receive said projections.

5. A device, as set forth in claim 1, wherein said support member has a projection extending radially outwardly into a groove in the inner wall of said bearing bush for interconnecting said support member and said bearing bush.

6. A device, as set forth in claim 1, wherein said support member is supported on a separate supporting ring held in a groove in the inner wall of said bearing bush.

7. A device, as set forth in claim 1, wherein said support member is formed of polyamide.

8. A device, as set forth in claim 1, wherein said bearing bush has an open end face located adjacent to said spider, said support member has at least one circumferentially extending support face in contact with the end face of said bearing bush, and said second sealing part has radially outwardly directed sealing lips thereon in contact with the inner face of said bearing bush for effecting a sealing action, and said sealing lips project angularly outwardly relative to the axis of said pin toward the open end of said bearing bush.

9. A device, as set forth in claim 1, wherein said bearing bush has an open end face located adjacent to said spider, and said first sealing part has radially outwardly directed sealing lips thereon in contact with the outer face of said pin for effecting a sealing action, and said sealing lips project angularly outwardly relative to the axis of said pin toward the open end of said bearing bush.

* * * * *